March 13, 1928.

W. McMEANS

FASTENER FOR SLEEVE BANDS

Filed Aug. 31, 1926

1,662,074

Inventor

William McMeans.

By Lacey & Lacey, Attorneys

Patented Mar. 13, 1928.

1,662,074

UNITED STATES PATENT OFFICE.

WILLIAM McMEANS, OF SCRANTON, PENNSYLVANIA.

FASTENER FOR SLEEVE BANDS.

Application filed August 31, 1926. Serial No. 132,793.

This invention relates to improvements in sleeve band fasteners and has as its primary object to provide a fastener which will permit a sleeve band to be more readily adjusted, applied, and removed, than such bands as have heretofore been employed. It is a well known fact that difficulty is experienced in removing the ordinary sleeve bands as the means for connecting the ends of the bands is usually of such a character that it is difficult to manipulate with the fingers of one hand, or, in other constructions, the band must be considerably stretched and then worked down over the arm in removing it. Therefore, the present invention contemplates the provision of a novel construction of connecting means for the ends of the band and which means is adapted to be readily manipulated by the thumb and forefinger of one hand in effecting a separation of its parts so as to provide for free removal of the band from the sleeve. Likewise, the invention contemplates a connecting means so constructed that its component parts may be readily connected by the employment of one hand for this purpose.

Figure 1:
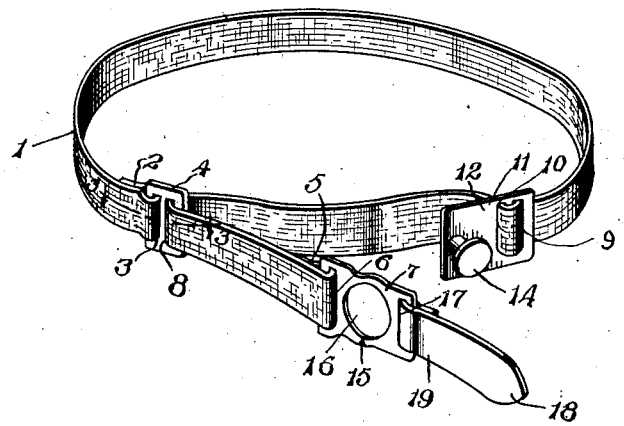
Figure 1 is a perspective view of a sleeve band embodying the improved fastener means.

The device embodying the invention comprises a band 1 which is either wholly or partly elastic, as desired, and which has one end secured as at 2 in a slot 3 formed in a friction slide 4, the other end of the band being passed through another slot 8 in the slide and having its extreme end portion formed into a loop 5 engaged through a slot 6 formed in one member 7 of the fastening or connecting device embodying the invention. The band, before being passed through the slot 8 is slidably connected, as at 9, through slots 10 formed in the other member of the connecting device, which member is indicated by the numeral 11 so that the member 11 may be adjusted longitudinally upon the band. The member 11 of the connecting device comprises a substantially rectangular plate 12 of sheet metal or any other material found suitable for the purpose and is provided at its end opposite the end in which the slots 10 are formed, with a stud 13 having a head 14.

The member 7 of the connecting device likewise comprises a substantially rectangular plate which preferably has rounded corners and which may be of sheet metal or any other material. This plate is formed between its ends with a circular opening 16 which is of a diameter somewhat greater than the diameter of the head 14 of the stud 13 so that the head of the stud may be readily engaged therethrough. However, the head 14 of the stud is of considerably greater diameter than the shank of the stud so that one side of the wall of the opening 16 will engage the shank of the stud when the members 7 and 11 are connected together and this portion of the member 11 will engage behind the head of the stud so as to prevent its disengagement therefrom. A slot 17 is formed in the member 7 at the end thereof opposite the end in which the slot 6 is formed, and a finger tab 18 which may be of leather, cloth, or any other material found suitable for the purpose and preferably flexible, is looped at one end, as at 19, and thus secured through the slot 17.

Figure 2:
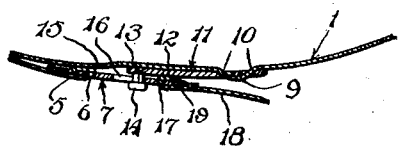
Figure 2 is a horizontal sectional view showing the fastening device in closed position.
Figure 3:
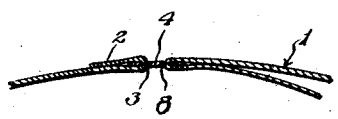
Figure 3 is a similar view of the friction slide taken on the line 3—3 of Fig. 1.
Figure 4:
Figure 4 is view similar to Figure 3, illustrating a slightly modified form of adjusting means for the band.

The particular advantage presented by the construction above described and illustrated in Figures 1 and 2 of the drawings, is that by grasping the tab 18 and pulling the end of the band which is connected to the member 7 toward the member 11 and at the same time pulling outwardly, the member 7 will be readily disengaged from the member 11, this separation of the parts being very readily accomplished by grasping the tab 18 between the thumb and forefinger of one hand with the middle finger resting against the member 11. It will now be evident that while the members 7 and 11 will have no tendency to become separated in the wearing of the band, they may be instantly separated by manipulating the tab 18 in the manner stated. If desired, a buckle, such as illustrated in Figure 4, and indicated by the numeral 20, may be substituted for the said slide 4.

Having thus described the invention, what I claim is:

A fastener of the character described comprising companion members, one fastener member consisting of a plate having one end portion provided with transversely extending band receiving slots spaced from each other longitudinally of the plate and a button having a shank carried by and extending from the other end portion of said plate and at its outer end provided with an enlarged head, the other fastener member consisting of a plate having one end portion formed with a slot to receive an end portion of a band and its intermediate portion provided with an enlarged opening materially greater in diameter than the head of said button and adapted to be disposed about the shank beneath the head of the button, the other end portion of the plate having a slot formed transversely therein, and an actuating tab engaged in the last-mentioned slot and extending from the plate.

In testimony whereof I affix my signature.

WILLIAM McMEANS. [L. S.]